United States Patent [19]

Makabe et al.

[11] Patent Number: 4,480,561
[45] Date of Patent: Nov. 6, 1984

[54] ELECTRONIC SEWING MACHINE WITH TROUBLE DIAGNOSING FUNCTION

[75] Inventors: Hachiro Makabe, Kanagawa; Haruhiko Tanaka, Tokyo; Akira Orii, Kanagawa; Takeshi Kongoh, Tokyo, all of Japan

[73] Assignee: Janome Sewing Machine Co., Ltd., Tokyo, Japan

[21] Appl. No.: 485,252

[22] Filed: Apr. 15, 1983

[30] Foreign Application Priority Data

Apr. 21, 1982 [JP] Japan ................................. 57-65377

[51] Int. Cl.³ .............................................. D05B 3/02
[52] U.S. Cl. ............................. 112/158 E; 112/158 F
[58] Field of Search ............... 112/158 E, 158 F, 275, 112/277, 121.11

[56] References Cited

U.S. PATENT DOCUMENTS 4,301,755 11/1981 Kato et al. ...................... 112/158 E
4,393,796 7/1983 Dunn et al. ...................... 112/158 E Primary Examiner—Peter P. Nerbun
Attorney, Agent, or Firm—Michael J. Striker

[57] ABSTRACT

A stitch pattern sewing machine utilizes a microcomputer which operates in a stitch control mode and in a malfunction diagnosing mode. Each mode is selectively rendered effective by a changeover switch. The diagnosis of malfunction includes a series of checking steps carried out in a predetermined order. Indication means are selectively illuminated to operate in either one of the two modes in dependence upon the position of the changeover switch.

1 Claim, 13 Drawing Figures

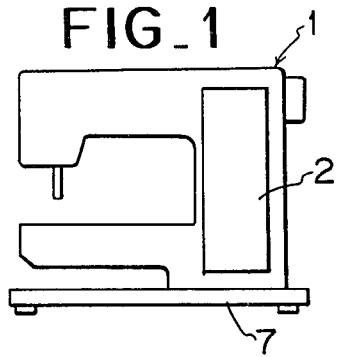
FIG_1
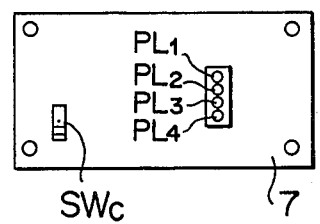
FIG_3
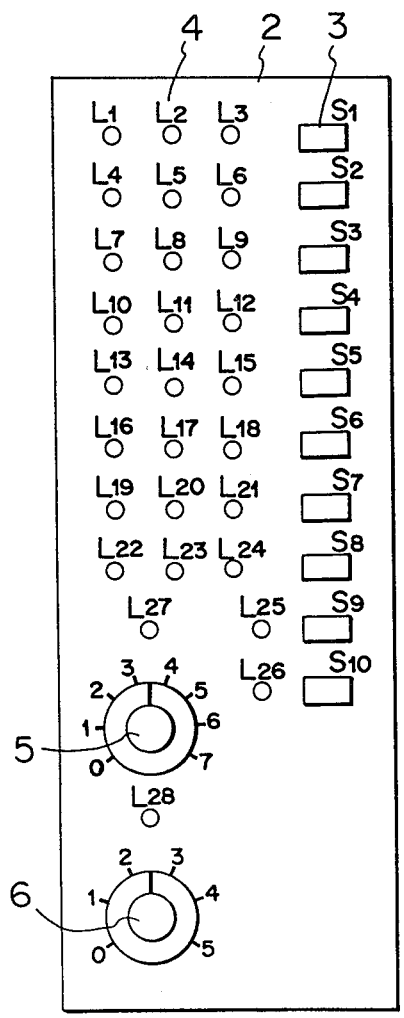
FIG_2
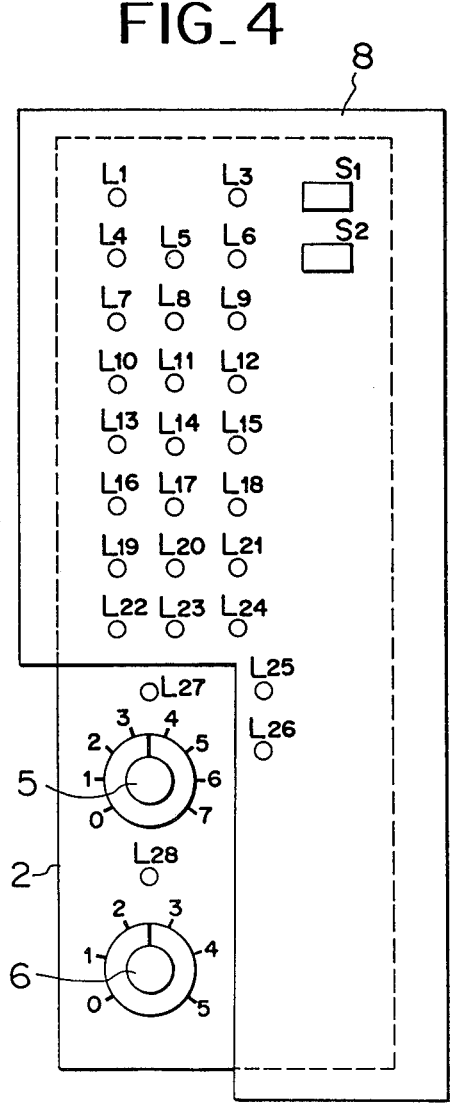
FIG_4

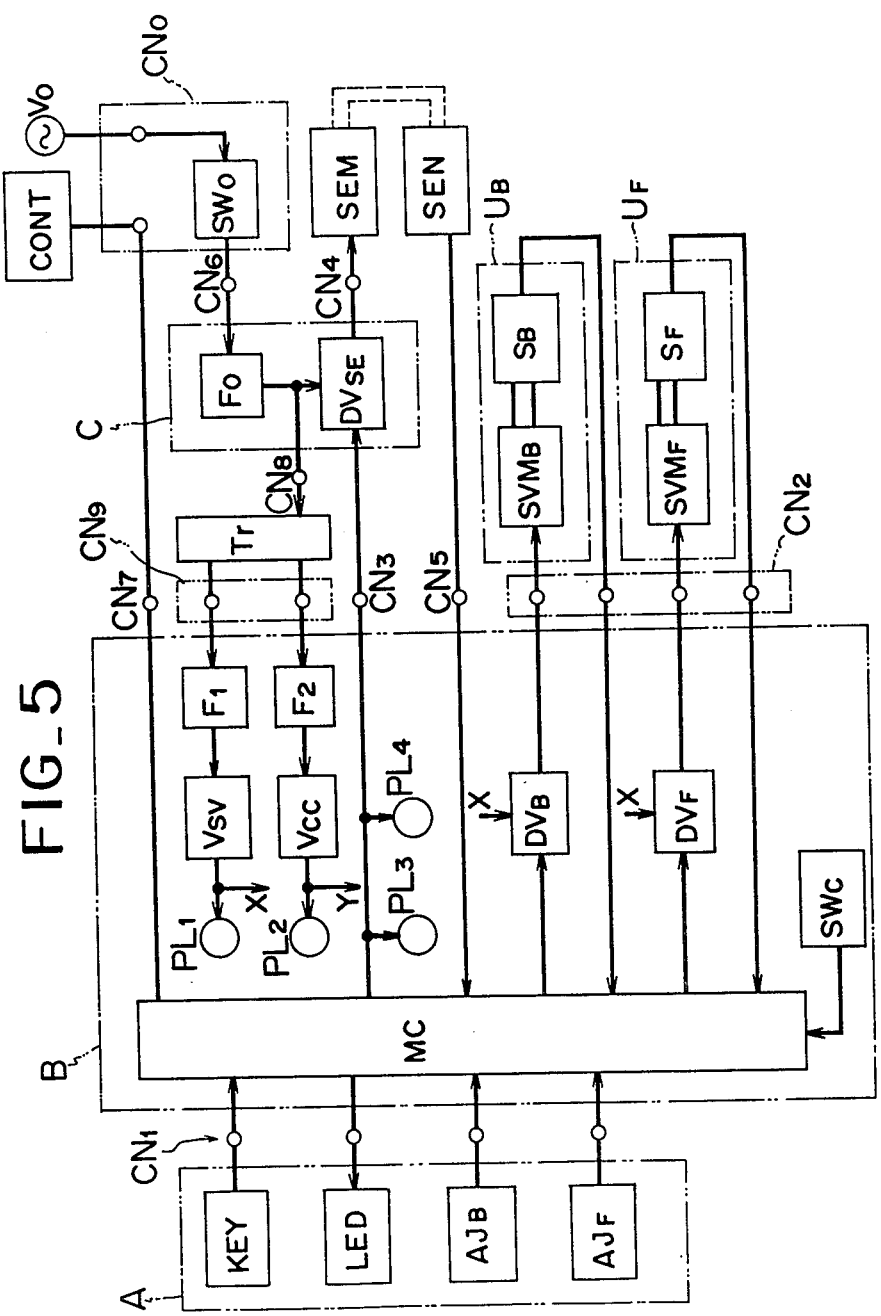
FIG_5

FIG_6(A)
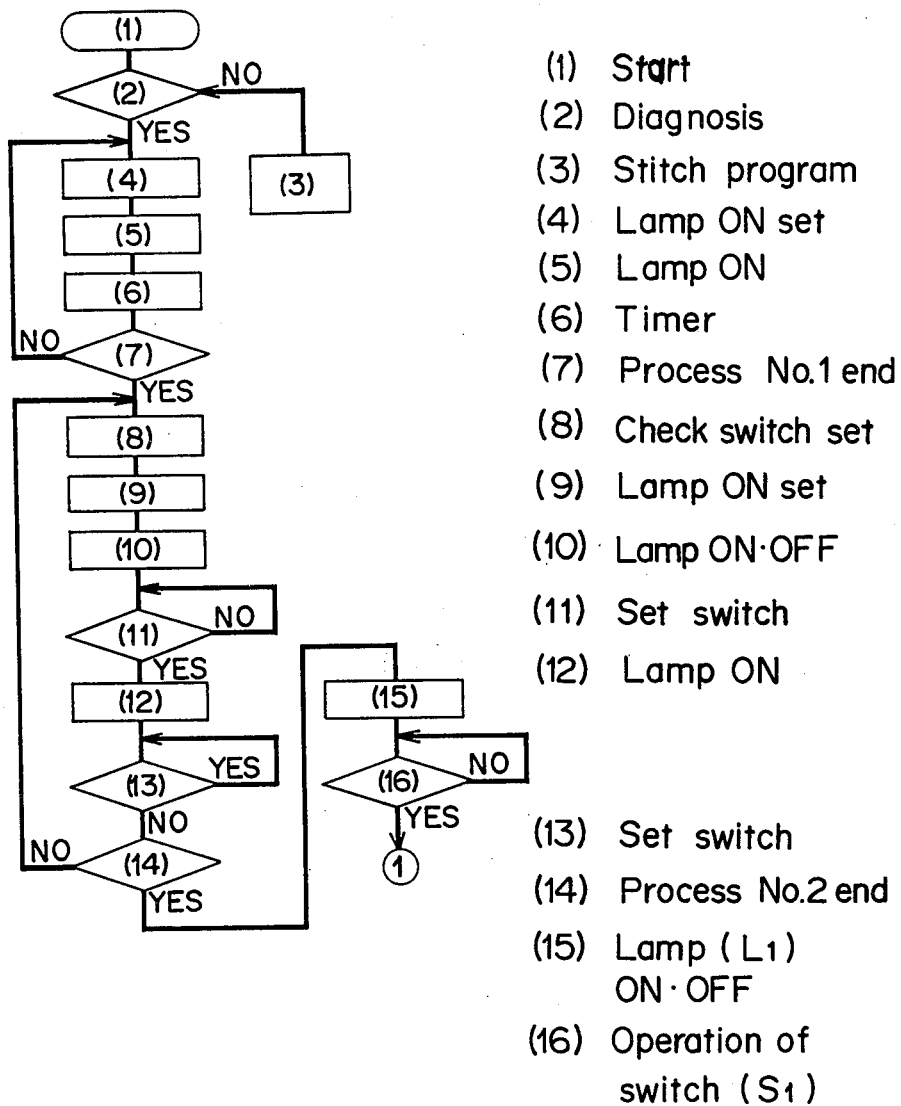
(1) Start
(2) Diagnosis
(3) Stitch program
(4) Lamp ON set
(5) Lamp ON
(6) Timer
(7) Process No.1 end
(8) Check switch set
(9) Lamp ON set
(10) Lamp ON·OFF
(11) Set switch
(12) Lamp ON
(13) Set switch
(14) Process No.2 end
(15) Lamp (L1) ON·OFF
(16) Operation of switch (S1)

FIG_6(B)
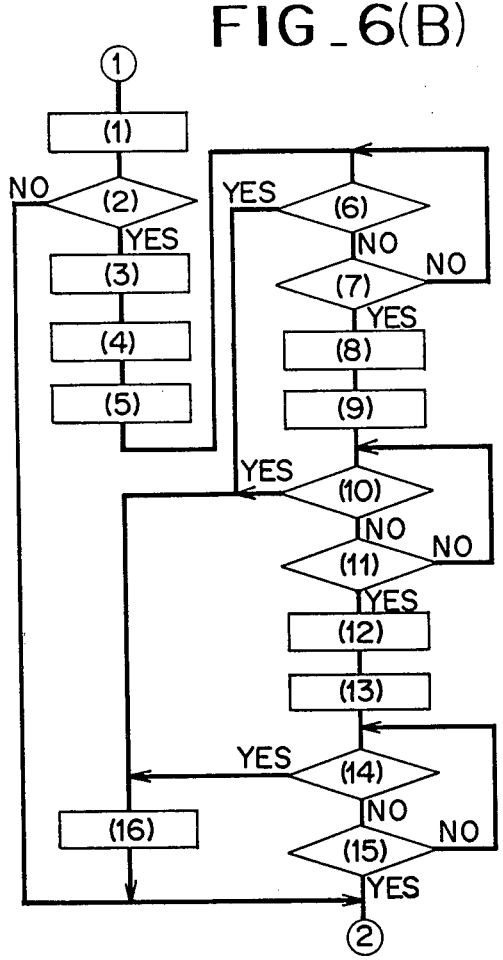
(1) Initial set of needle swing control motor
(2) Initial set OK
(3) Initial set OK registered
(4) Needle left position set
(5) Lamp (L4) ON·OFF
(6) Switch (S2)
(7) Switch (S1)
(8) Needle position center set
(9) Lamp (L5) ON·OFF
(10) Switch (S2)
(11) Switch (S1)
(12) Needle right position set
(13) Lamp (L6) ON·OFF
(14) Switch (S2)
(15) Switch (S1)
(16) Mechanism wrong registered

FIG_6(C)

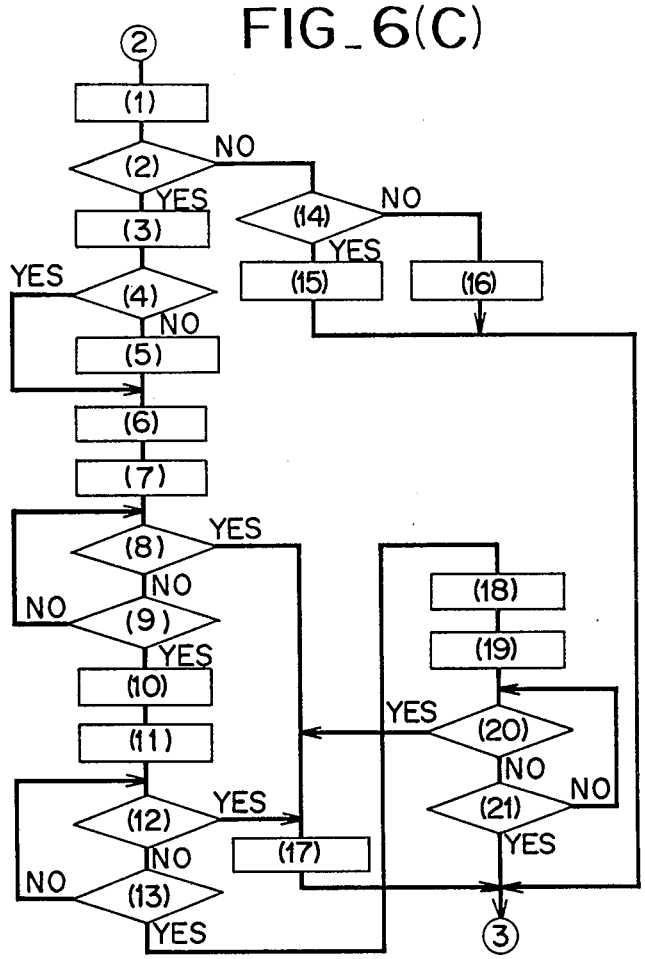

(1) Initial set of feed control motor
(2) Initial set OK  (3) Initial set registered
(4) Initial needle position set OK  (5) Print board B and needle swing control motor wrong registered
(6) Feed-2.5mm set  (7) Lamp(L7) ON·OFF
(8) Switch(S2)  (9) Switch(S1)  (10) Feed 0 set
(11) Lamp(L8) ON·OFF  (12) Switch(S2)
(13) Switch(S1)  (14) Initial needle position set OK
(15) Print board B and feed control motor wrong registered
(16) Print board B wrong registered  (17) Mechanism wrong registered  (18) Feed 5mm set  (19) Lamp(L9) ON·OFF
(20) Switch(S2)  (21) Switch(S1)

FIG_6(D)
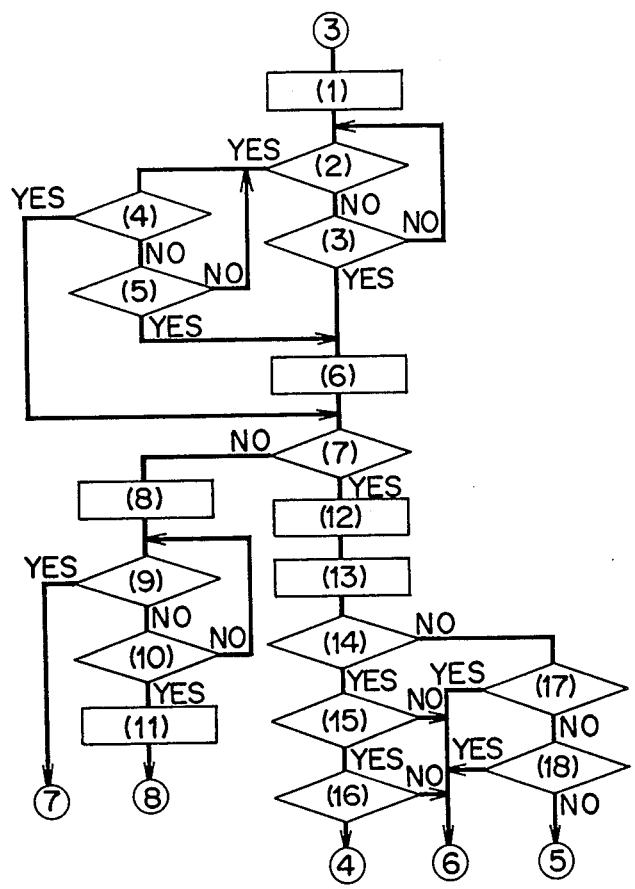
(1) Lamp (L₁₀) ON·OFF  (2) Controller nonconductive
(3) Switch (S₂)  (4) Controller normal  (5) Switch (S₂)
(6) Controller wrong registered  (7) Machine stop
(8) Lamp (L₁₁) ON·OFF  (9) Switch (S₁)
(10) Switch (S₂)  (11) Print board B wrong registered
(12) Lamp (L₁₁) ON  (13) 120 rpm set  (14) 120 rpm
(15)/(17) Senson upper position normal
(16)/(18) Senson lower position normal

FIG_6(E)

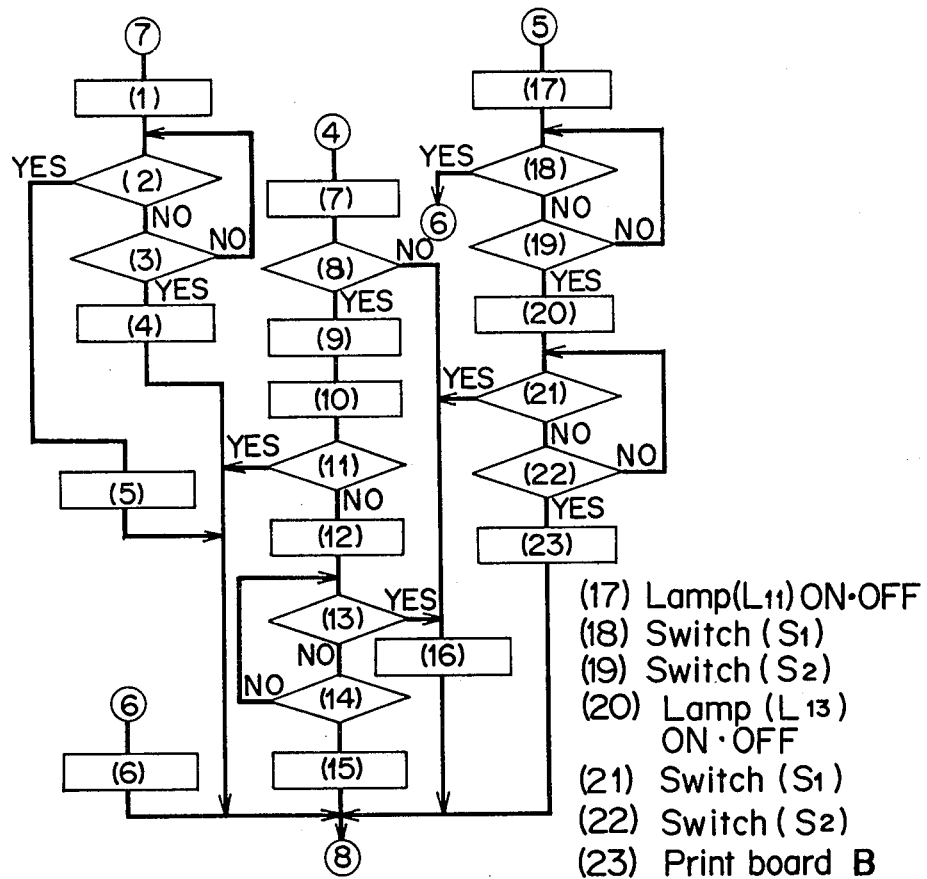

(1) Lamp(L1) ON·OFF
(2) Switch (S1)   (3) Switch (S2)   (4) Print board C wrong registered   (5) Print board B wrong registered   (6) Upper shat senson wrong registered
(7) 1000 rpm set   (8) Above 800 rpm   (9) Needle upper position stop set   (10) Lamp (L12) ON
(11) Upper position stop range of needle
(12) Lamp (L14) ON·OFF   (13) Switch (S1)
(14) Switch (S2)   (15) Print board B wrong registered
(16) Print board C wrong registered
(17) Lamp(L11) ON·OFF
(18) Switch (S1)
(19) Switch (S2)
(20) Lamp (L13) ON·OFF
(21) Switch (S1)
(22) Switch (S2)
(23) Print board B wrong registered

FIG_6(F)
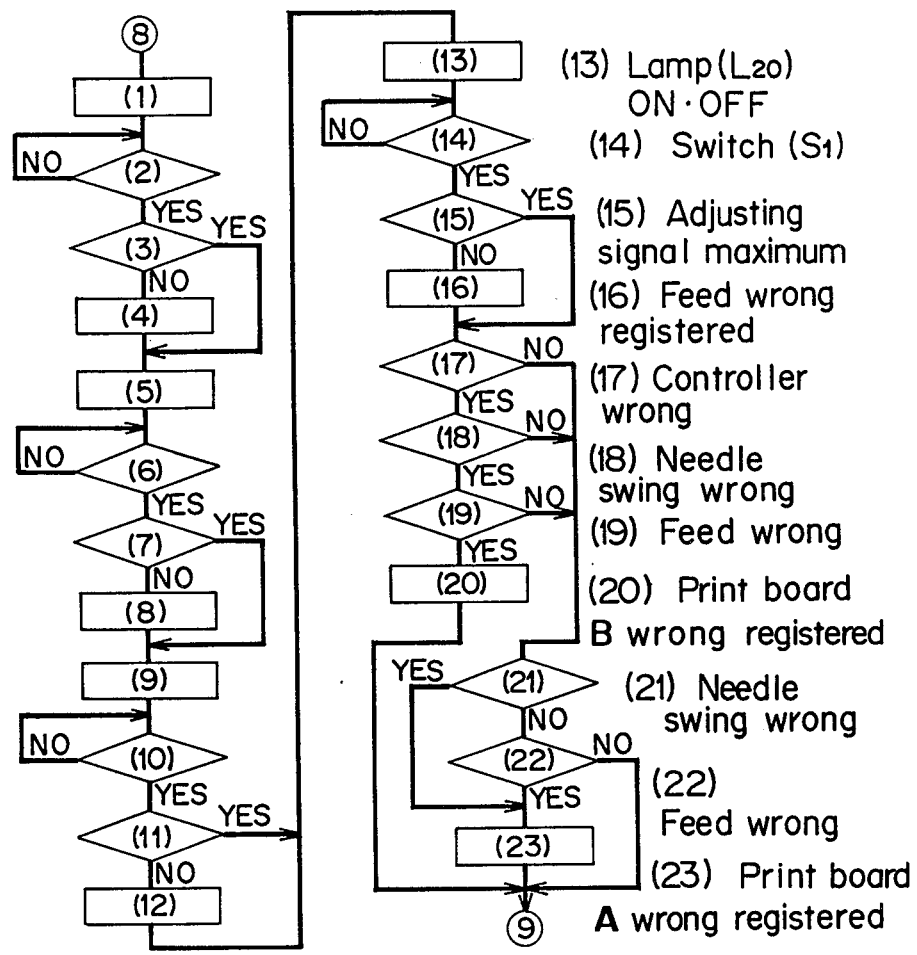
(1) Lamp(L16) ON·OFF  (2) Switch (S1)  (3) Adjusting signal minimum  (4) Needle swing wrong registered
(5) Lamp(L17) ON·OFF  (6) Switch(S1)  (7) Adjusting signal maximum  (8) Needle swing wrong registered
(9) Lamp (L19) ON·OFF  (10) Switch (S1)
(11) Adjusting signal minimum
(12) Feed wrong registered

FIG_6(G)
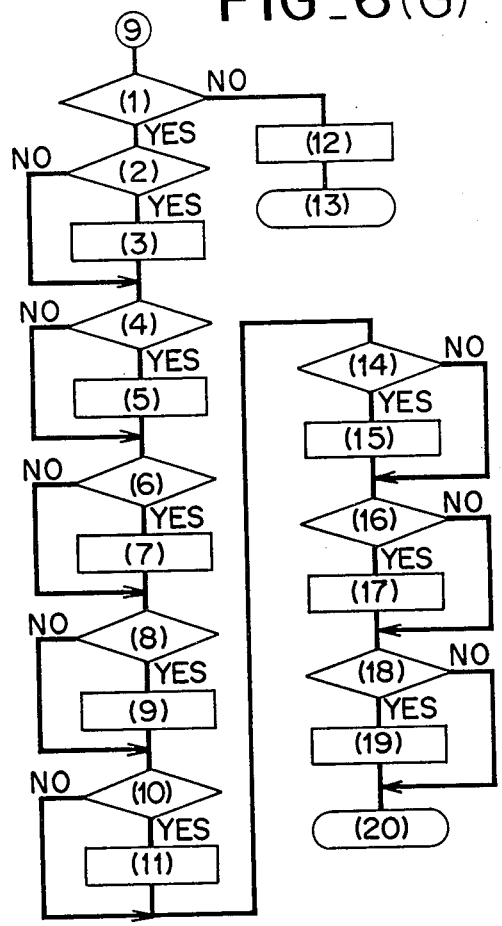
(1) Wrong registered    (2) Mechanism wrong
(3) Lamp (L15) ON    (4) Print board A wrong
(5) Lamp (L18) ON    (6) Print board B wrong
(7) Lamp (L21) ON    (8) Upper shaft sensor wrong
(9) Lamp (L22) ON    (10) Controller wrong
(11) Lamp (L23) ON    (12) Lamp (L3) ON    (13) End
(14) Print board C wrong    (15) Lamp (L24) ON
(16) Needle swing control motor wrong
(17) Lamp (L25) ON    (18) Feed control motor wrong
(19) Lamp (L26) ON    (20) End

FIG_7

| L₁〜L₂ | PL₁ | PL₂ | Treatment |
|---|---|---|---|
| NO one is ON | OFF | OFF | ① Check and exchange of fuse (Fo)<br>② Exchange of transformer (Tv)<br>③ Exchange of print board (B)<br>④ Exchange of print board (A) |
| | ON | OFF | ① Check and exchange of fuse (F₂)<br>② Exchange of print board (B)<br>③ Exchange of print board (A) |
| | ON or OFF | ON | ① Exchange of print board (B)<br>② Exchange of print board (A) |
| Some are not ON | | | ① Exchange of print board (A)<br>② Exchange of print board (B) |

4,480,561

ELECTRONIC SEWING MACHINE WITH TROUBLE DIAGNOSING FUNCTION

BACKGROUND OF THE INVENTION

The invention relates to an electronic sewing machine which is controlled with electric signals to produce stitches, and is provided with a device for electrically diagnosing malfunctions of the electric components and the parts related thereto.

Because of the wide distribution of electronic sewing machines, integrated circuits have been used in the household sewing machine. However, the maintenance of the sewing machine has often required a skilled electric knowledge and a particular separate trouble diagnosing device. Therefore the sewing machine makers have not been able to supply good service to the sewing machine users after the makers have sold the sewing machine.

SUMMARY OF THE INVENTION

The invention has been provided to eliminate the defects and disadvantages of the prior art. It is therefore a primary object of the present invention to supply the electric control part of the sewing machine with the functions of both stitch control and trouble diagnosing control, which may be selectively effectuated by operation of a changeover switch.

It is another object of the present invention to utilize the pattern selecting switches and the indicating illumination lamps for designation of stitch patterns and indication thereof and for designation of malfunction diagnosing processes and indication of diagnosed results.

According to the present invention, the sewing machine is incorporated with a microcomputer which has a stitch control operation program and a malfunction diagnosing operation program. These two programs may be selectively effectuated by a changeover switch. With the operation of the changeover switch, the pattern selecting switches and the related indicating illumination lamps are used for actual pattern selection as the specific function thereof in accordance with the stitch control operation program or for designating the malfunction diagnosing processes and indicating the results in accordance with the malfunction diagnosing operation program.

BRIEF DESCRIPTION OF THE DRAWINGS

FIG. 1 is a side view of a sewing machine of the present invention;

FIG. 2 is a view of the operating panel of the sewing machine shown in FIG. 1;

FIG. 3 is a bottom view of the sewing machine of FIG. 1;

FIG. 4 is a view showing a trouble diagnosing attachment form to be placed on the operating panel of the sewing machine shown in FIG. 1;

FIG. 5 is a control circuit block diagram showing an embodiment of the present invention;

FIGS. 6A to 6E are flow charts of control for the sewing machine shown in FIG. 1; and FIG. 7 is a table showing the diagnosis instructions for the sewing machine shown in FIG. 1.

DETAILED DESCRIPTION OF THE PREFERRED EMBODIMENT

FIG. 1 shows the outer appearance of the sewing machine. On a panel 2 at a front part of the sewing machine 1, there are disposed, as shown in FIG. 2, a switch operating part 3, an indicating part 4, a stitching width adjusting dial 5 and a feed adjusting dial 6. On a bottom side 7 of the sewing machine 1, there are, as shown in FIG. 3, a switch (SWc), pilot lamps (PL$_1$), (PL$_2$), (PL$_3$) and (PL$_4$) which are normally untouchable in the ordinary use of the sewing machine. The switch (SWc) switches the control circuit of the sewing machine between an ordinary sewing function and a malfunction diagnosing function. The pilot lamp PL$_1$ is an indicator for the driving power source of the stitch control motors. The pilot lamp (PL$_2$) is an indicator for the power source of the control circuit. The pilot lamp (PL$_3$) is an indicator for the drive control signal of the machine motor. The pilot lamp (PL$_4$) is an indicator for the control signal of the machine motor braking.

The switch operating part 3 comprises a set of pattern selection switches (S$_1$) to (S$_8$), a switch (S$_9$) for finish-up stitching, a low speed designating switch (S$_{10}$), a stitching width control dial 5 and a feed control dial 6.

The indicating part 4 comprises illumination lamps (L$_1$) to (L$_{28}$). The lamps disposed in a row, for example, (L$_1$), (L$_2$), (L$_3$), switchingly light in succession for each operation of the switch (S$_1$) when a pattern corresponding to the lighting lamps is selected. The patterns corresponding to the lamps (L$_1$) to (L$_{24}$) are selected in response to the operation of the switches (S$_1$) to (S$_8$). The switch (S$_9$) of the finish-up stitching and the switch (S$_{10}$) of the low speed, correspond to the lamps (L$_{25}$) and (L$_{26}$), respectively.

Each time the dials 5 and 6 are pushed they become effectuated to adjust the lateral swinging movement of the needle and the fabric feed respectively by rotating the same dials, and each becomes effectuated to set the sewing machine to an automatic stitching mode irrespective of the rotation of the dials. When the dials are switched to the manual rotation adjustment, the lamps (L$_{27}$) (L$_{28}$) light, and then the adjustment value is designated by the rotation of the dials.

FIG. 4 shows the malfunction diagnosing attachment form 8 attached on the operating panel 2. It is made of a thick paper which is formed with holes in correspondence to the position of the switches (S$_1$) (S$_2$), the lamps (L$_1$) (L$_3$) etc. Although not shown, the thick paper is printed with letters or marks for indicating the switches and lamps, and for instructing the diagnosing processes.

FIG. 5 is a control circuit diagram in which a print board (A) is attached to the inner side of the operating panel 2 of FIG. 1. A key board (KEY) including a key matrix (not shown) is scanned by a signal from a print board (B) when the switches (S$_1$–S$_{10}$) and the dials 5, 6 are operated, and the resultant designated information is given to the print board (B). The light indicating board (LED) selectively lights the lamps (L$_1$) to (L$_{28}$) of the indicating part 4 in accordance with the signals from the print board (B). A stitching width adjusting device (AJ$_B$) and a feed adjusting device (AJ$_F$) give the print board (B) switch operating information when the dials 5 and 6 are pushed and adjusting position information when they are rotated. The print board (B) substantially constitutes a microcomputer (MC), and is attached to the inner side of the bottom 7 of the machine body 1. The parts of the print board (A) are each connected to the microcomputer by a connector (CN$_1$).

The microcomputer (MC) prepares a stitch control operation program which is an inherent function of the electronic sewing machine, and also prepares a malfunction diagnosing control operation program which diagnoses malfunctions in the electric components of the sewing machine and mechanical components related to the electric components. The two different programs are selectively effectuated by the operation switch (SWc). A needle swing control motor driving circuit ($DV_B$) is provided on the print board (B) and receives a control signal from the microcomputer (MC) and controllably drives a needle swing control motor ($SWM_B$) (a pulse motor, in the present embodiment). A position signal from a position sensor ($S_B$) (for setting an initial position of the pulse motor, in the present embodiment), which is mechanically connected to the motor, is furnished to the microcomputer (MC). A feed control motor driving circuit ($DV_F$) is attached to the print board (B) and receives control signals from the microcomputer (MC) and controllably drives the feed control motor (pulse motor) ($SVM_F$), and in the same way, the position signal of the position sensor (SF) (For setting the initial position of the pulse motor) is funished to the microcomputer (MC). Control motor units ($U_B$) ($U_F$) each comprise a couple, formed from the control motor and the position sensor, and are connected to the corresponding drive circuits of the print board (B) through a connector ($CN_2$).

Print board (C) substantially constitutes a machine motor driving circuit ($DV_{SE}$) which receives, via a connector ($NC_3$), a machine motor speed control signal and a braking control signal for stopping the needle at a determined position, and furnishes a driving control signal to the machine motor (SEM) through a connector ($CN_4$). An upper shaft sensor (SEN) is mounted on an upper shaft (not shown) to be driven by the machine motor (SEM), and furnishes, via a connector ($CN_5$) to the microcomputer (MC), a needle swing control phase signal, a feed control phase signal and a rotation speed signal of the upper shaft. An external wire connector ($CN_0$) receives a commercial power source ($V_0$). The connector ($CN_0$) has a power source switch ($SW_0$) and furnishes the power source ($V_0$) to the machine motor driving circuit ($DV_{SE}$) via a connector ($CN_6$) and a power source fuse ($F_0$). The external wire connector ($CN_0$) is connected to pedal controller (CONT) for controlling the speed of the machine motor and furnishes an electric signal effectuated by the operation of the controller to the microcomputer (MC) of the print board (B).

A primary side of a power source transformer (Tr) is connected to the print board (C) via a connector ($CN_8$) and receives the power source ($V_0$) via the fuse ($F_0$). A secondary side thereof is connected to the print board (B) via the connector ($CN_9$) and supplies the power source to a control motor driving power source circuit (Vsv) via a fuse ($F_1$) and also supplies the electric current to a control power source (Vcc) of a control circuit device. Output (X) of the control motor driving power source circuit (Vsv) is supplied to the needle swing control motor driving circuit ($DV_B$) and to the feed control motor driving circuit ($DE_F$). Output (Y) of the power source circuit (Vcc) is supplied to each of the circuits of the print boards (A) (C). The print board (B) is provided with the pilot lamps ($PL_1$) ($PL_2$) of the outputs (X) (Y) and pilot lamps ($PL_2$) ($PL_3$) of the machine motor speed control signal and the brake control signal to be supplied to the machine motor driving circuit ($DV_{SE}$).

Explanation as to the stitch control operation of the control circuit in FIG. 5 is dispensed with because the operation is described in the copending Japanese patent application 53-145280 by the same applicant. A further explanation will be made to the malfunction diagnosing operation of the invention with reference to the flow charts. If the power switch ($SW_0$) is turned on when the switch (SWc) is positioned at the normal sewing function designating side, then the stitch control operation program is started by the microcomputer (MC). If the switch (SWc) is positioned at the malfunction diagnosis function designating side, then the malfunction diagnosis control operation is started. The process No. 1 is to light and check the indicating part 4. The lamps ($L_1$) to ($L_{28}$) are divided into groups comprising three lamps per line. The lamps (a first group is $L_1$, $L_2$, $L_3$) in each of the groups are lighted (ON) and the groups are either switched ON sequentially or the lamps are switched ON one by one at a predetermined time interval by a timer. The process No. 1 is repeated if all of the lamps do not light ON. If all of the lamps are not lit, the diagnosing operator checks and takes the required action in accordance to the instructions of the table shown in FIG. 7 which may be printed on the attachment form 8. If none of the lamps ($L_1$) to ($L_{28}$) are lit, the pilot lamps ($PL_1$) ($PL_2$) on the bottom side 7 of the sewing machine 1 are checked. If the two pilot lamps are not lit (OFF), the fuse ($F_0$) is checked and if necessary replaced, the transformer (Tr) is replaced and the print boards (B) (A) are replaced in accordance with the predetermined order, from the numbers 1 to 4 of the instructions of the table shown in FIG. 7, while the condition of the lamps ($L_1$) to ($L_{28}$) is observed each time the instructions 1 to 4 are fulfilled.

If the pilot lamp ($PL_1$) is ON and the pilot lamp ($PL_2$) is OFF, then it is required to check and if necessary replace the fuse ($F_2$) and the print boards (B) (A) in the order of the numbers 1, 2, 3. If the pilot lamp ($PL_2$) is ON, the print board (B) and (A) are replaced in the order of the numbers 1, 2 irrespective of the ON or OFF of the pilot lamp ($PL_1$). If some of the lamps ($L_1$) to ($L_{28}$) are not ON, then the print boards (A) and (B) are replaced in accordance with the order of the numbers 1, 2. When all of the lamps ($L_1$) to ($L_{28}$) are lit (ON), the program advances to the process No. 2, on the assumption that there is no malfunction in the process No. 1. This is to check the switching function by the switch operating part 3, and a checking switch is set first. Firstly, the switch ($S_1$) is set and the lamp ($L_1$) is set and is alternately turned ON and OFF to indicate the checking designation of the switch ($S_1$). When the switch ($S_1$) is pushed, the ON-and-OFF operation of lamp ($L_1$) is changed to continuous lighting, and then the diagnosing operator knows that the switch ($S_1$) is functioning. When the switch ($S_1$) is released, the checking switch ($S_2$) is set, and the lamp ($L_4$) is alternately turned ON and OFF to indicate the checking designation of the switch ($S_2$). In the same way, the subsequent switches ($S_3$-$S_{10}$) and the switching functions of the dials 5, 6 are checked and confirmed. Thus, the process No. 2 is completed and the program advances to the sequence No. 3. In the process No. 2, if the operation of any switch does not change the ON-and-OFF of the lamps to the ON condition, then something is malfuncting with the switch and the print board (A) is replaced. If then the switch is still malfunctioning, then the print board (B) is replaced.

The process No. 3 confirms the electric functions of the sewing machine under the condition that the process No. 1 and No. 2 show that the switching functions and the lamp indication functions are functioning properly. In this case lamp ($L_1$) is first alternately turned ON and OFF to inform the operator that this is the diagnosis of the process No. 3. The operator attaches the attachment form 8 shown in FIG. 4 to the operating panel 2 of the sewing machine 1. The attachment form 8 is a guide for advancing the program, in a dialogue system, through operations of the switches ($S_1$) ($S_2$) and the lamps ($L_1$) ($L_3$) on the operating panel 2, and although not shown, guide words are printed at positions corresponding to the lamps and the switches. For example, the word "prepared" is printed in correspondence to the lamp ($L_1$), and "YES" is printed for the switch ($S_1$) for confirming the preparation or the normal operation.

When the switch ($S_1$) is operated, the program advances to the next function confirmation. That is, to junction (1) in FIGS. 6A and 6B. Then the needle swing control motor (pulse motor) ($SVM_8$) is driven, and the position sensor ($S_B$) reverts to the predetermined initial position where the sensor receives a detecting signal to indicate that the motor has been set to the initial position. Furthermore, the motor ($SVM_B$) is operated and the needle is brought to the leftmost position of the maximum amplitude, and the lamp ($L_4$) is alternately turned ON and OFF. At this position, the words "Needle left" are printed and the operator knows that the needle is at the left position. When the needle is positioned at the left and the switch ($S_1$) is operated to confirm that the electric control is functioning properly, the motor ($SVM_B$) is operated and brings the needle to the center of the maximum needle amplitude, and then the lamp ($L_5$) is alternately turned ON and OFF. When the switch ($S_1$) is operated, the needle is brought to the rightmost of the maximum amplitude, and then the lamp ($L_6$) is alternately turned ON and OFF, and the program advances to junction (2) of the flow chart in FIGS. 6B and 6C by the operation of the switch ($S_1$). If the indications of the lamps ($L_4$) ($L_5$) ($L_6$) are not in the normal relation with the corresponding positions of the needle, then the operator operates the switch ($S_2$) on which the word "NO" is printed. Then, it is indicated that the needle swing mechanism in connection with the needle swing control motor ($SVM_B$) is not correctly adjusted, and the program advances to junction (2).

If the motor does not finish the initial setting, the program advances to junction 2. The feed control motor (pulse motor) ($SVM_F$) is operated, and the position sensor ($S_F$) is brought to the initial position, and the initial setting is indicated. If the needle swing control motor ($SVM_B$) does not complete the initial setting, it is indicated that the print board (B) is malfunctioning and the needle amplitude control motor ($SVM_B$) is malfunctioning. Then the feed control motor ($SVM_F$) is operated and the maximum reverse feed is set, and the lamp ($L_7$) is alternately turned ON and OFF, which is printed with the mark "−2.5 mm" indicating the maximum reverse feed. If the needle swing control motor ($SVM_B$) completes the initial setting, the feed is set and the lamp is alternately turned on and off without the "malfunction" indications.

The operator manually and slowly drives the sewing machine and checks that the fabric is fed backwardly by 2.5 mm, and operates the switch ($S_1$). With operation of the switch ($S_1$), the feed is set at 0 and the corresponding lamp ($L_{18}$) is alternately turned on and off. The operator manually drives the sewing machine to check it and then operates the switch ($S_1$). With the operation of the switch ($S_1$), the normal feed of 5 mm is set and the corresponding lamp ($L_9$) is alternately turned on and off, and the operator drives the sewing machine to check this and the program advances to the junction (3). If the feeds corresponding to the lamps ($L_7$) ($L_8$) ($L_9$) are not proper; the information is indicated by the operator's operation of the switch ($S_2$), and the program advances to the junction (3). If the feed control motor does not finish the initial setting and if the initial setting of the needle swing control motor ($SVM_B$) has been finished, it is then indicated that the print board (B) and the feed control motor are malfunctioning, and the program advances to the junction (3). If the needle swing motor ($SVM_B$) has not finished the initial setting, it is indicated that the print board (B) is malfunctioning, and the program advances to the junction (3). Then the lamp ($L_{10}$) is alternately turned on and off, where the words "Press machine controller" are printed, and the operator knows that he should press the controller (CONT).

By operation of the controller (CONT), the controller becomes conductive. It is normal that the sewing machine is non-moving irrespective of the condition of the controller, pressed or not. The lamp ($L_{11}$) is then turned on where the word "rotation" is printed, and the sewing machine is set at the low speed rotation (120 rpm). When the controller is inconductive or not normal in the speed control or has been made conductive, it is indicated by operating the switch ($S_2$) that the controller is malfunctioning and the lamp ($L_{11}$) is turned on and the sewing machine is rotated at a low speed. When the sensor (SEN) of an upper shaft is normally operated, to detect the rotation speed (120 rpm), the needle swing control phase (called "upper position") and the feed control phase (called "lower position"), the program then advances to the juncture (4), since the detecting controls of the upper shaft sensor (SEN) are functioning properly.

When the upper shaft sensor (SEN) does not detect any of these, the program advances to the junction (5), and the lamp ($L_{11}$) is alternately turned on and off, and the operator knows that he should check if the sewing machine is operating. If the sewing machine is not operating, and the switch ($S_2$) is operated, and the lamp ($L_{11}$) is alternately turned on and off where the words "PL3 lighting" are printed, then the operator knows that he should check if the pilot lamp (PL3) on the bottom side 7 of the sewing machine 1 is lit. If the lamp is not lit and if then the switch ($S_2$) is operated it is indicated that the print board (B) is malfunctioning, then the program advances to the junction (8). If the pilot lamp (PL3) is not lit, and if then the switch ($S_1$) is operated, it is indicated that the print board (C) is malfunctioning, and then the program advances to the junction (8).

If the detecting controls of the upper shaft sensor (SEN) are partly malfunctioning or if the operator confirms the rotation of the sewing machine after the junction (5) and then operates the switch ($S_1$), and it is indicated that the upper shaft senser (SEN) is malfunctioning via the junction (6), then the program advances to the junction (8). When the lamp ($L_{11}$) does not light, the upper shaft snsor (SEN) produces a rotation signal of the sewing machine in the discrimination of stopping of the sewing machine. The lamp ($L_{11}$) is then alternately turned on and off and operator checks the rotation of the sewing machine. If the sewing machine is not operating, the switch ($S_2$) is operated to indicate that the print board (B) is malfunctioning, and the program advances to the junction (8). If the sewing machine is operative and, the switch ($S_1$) is operated, then the program advances to the juncture (7) and the lamp ($L_{13}$) is alternately turned on and off. The operator checks if the pilot lamp ($PL_{13}$) is lit. If the lamp is lit and then the switch ($S_1$) is operated, this indicates that the print board (B) is malfunctioning. If the lamp is not lit and the switch ($S_2$) is then operated, it is indicated that the print board (C) is malfunctioning and then the program advances to the juncture (8).

If the program advances to the juncture (4), the sewing machine is set at a high speed rotation (1000 rpm).

If the rotation speed is above 800 (rpm), the sewing machine is set at the upper dead point of the needle stopping, and the machine motor (SEM) is then stopped and the lamp ($L_{12}$) is lit, where the words "Upper stopping" are printed, then the operator knows that the sewing machine is set at the upper dead point of the needle stopping. If the sewing machine is stopped within a determined range, the program advances to the juncture (8). If the sewing machine is stopped outside of this range, the lamp ($L_{14}$) is alternately turned on and off, where the words "$PL_4$ lighting" are printed, then the operator knows that he should check if the pilot lamp ($PL_4$) is lit on the bottom side of the sewing machine 1. If the lamp lights and then the switch ($S_1$) is operated, it is indicated that the print board (C) is malfunctioning and the program then advances to the juncture (8). When the lamp does not light, and then the switch ($S_2$) is operated, it is indicated that the print board (B) is malfunctioning and the program advances to the juncture (8) and the lamp ($L_{16}$) is then alternately turned on and off, where the words "Width dial 0" are printed then the operator knows that he should rotate the stitch width adjusting dial 5 to a scale "0".

When the stitch width adjusting dial is rotated to the scale "0" and then the switch ($S_1$) is operated, it is indicated on the condition that the stitch width adjusting signal is not minimal, that the width adjustment is wrong. If it is minimal, then the lamp ($L_{17}$) is alternately turned on and off without this indication, where the words "Width dial 7" are printed, then the operator knows that he should rotate the dial 5 to the scale "7". If the dial is rotated to the scale "7" and the switch ($S_1$) is operated, the same indication is made in dependence upon whether or not the stitch width adjusting signal is maximum, or the lamp ($L_{19}$) is alternately turned on and off without the indicating, where the words "Feed dial 0" are printed, then the operator knows that he should rotate the feed adjusting dial 6 to the scale "0". If the dial 6 is rotated to the scale "0" and the switch ($S_1$) is operated, then it is indicated that the feed control is malfunctioning on the condition that the feed adjusting signal is not minimal. If the feed adjusting signal is minimal, the lamp ($L_{20}$) is alternately turned on off without this indication, where the words "Feed dial 5" are printed, then the operator knows that he should rotate the dial 6 to the scale "5".

When the dial 6 is rotated to the scale 5 and then the switch ($S_1$) is operated, the indication is made in dependence upon whether or not the feed control signal is maximal, or the program advances to a next one without this indication. If all are indicated that the controller (CONT) is malfunctioning, the stitch width adjustment by the dial 5 is wrong and the feed adjustment by the dial 6 is wrong, it is indicated that the print board (B) is malfunctioning and the program then advances to the junction (9). If none of the above items is indicated, then the program advances to the junction (9) without indication that the print board (B) is malfunctioning. If any one of the stitch width adjustment value and the feed adjustment value is wrong, it is indicated that the print board (A) is malfunctioning, and the program then advances to the junction (9).

All the judgements of the diagnosed items are finished at the juncture (9), and the judged results are indicated. If there are no indications of malfunctioning items the lamp ($L_3$) lights to indicate that all is "Normal" and the program finishes. If the mechanism is malfunctioning, the lamp ($L_{15}$) is lit where the words "Control of mechanism" are printed. When the print board (A) is malfunctioning, the lamp ($L_{18}$) is lit where the words "Exchange of A board" are printed. When the print board (B) is malfunctioning, the lamp ($L_{21}$) is lit where the words "Exchange of B board" are printed. When the upper shaft sensor (SEN) is malfunctioning, the lamp ($L_{22}$) is lit where the word "SEN" is printed. When the controller (CONT) is malfunctioning, the lamp ($L_{23}$) is lit where the word "CONT" is printed. When the print board (C) is malfunctioning, the lamp ($L_{24}$) is lit where the word "C board" is printed. When the needle swing control motor ($SVW_B$) is malfunctioning, the lamp ($L_{25}$) is lit where the words "Needle swing control motor" are printed. When feed control motor ($SVM_F$) is malfunctioning, the lamp ($L_{26}$) is lit where the words "Feed control motor" are printed. The lamps are lit individually or simultaneously to indicate the malfunctioning parts, and the program is finished.

As having mentioned above, the malfunction diagnosing function is provided in the microcomputer for controlling the various stitching operations of the sewing machine. The diagnosing function is selectively effectuated together with the switches and indicating lamps which are specific to the conventional sewing machine. Therefore the structure for the diagnosing function is extremely simple, and accordingly the sewing machine may be easily diagnosed without professional knowledge and without any special diagnosing instruments.

What we claim is:

1. An electronic sewing machine having stitch forming devices including electric components and mechanical components which may be controlled in connection with the electric components, and which may be operated by electromagnetic drive motors controlled by electric stitch control signals to thereby produce stitch patterns, the sewing machine comprising;
    (a) a microcomputer provided with an operation program for stitch control by the electric components and the mechanical components, and an operation program for diagnosing the malfunctions of the electric components and the mechanical components, said diagnosing program including the processes for checking predetermined items of the electric components and the mechanical components in a predetermined order, and the designation thereof and for indicating the checking results:
    (b) a changeover switch selectively operated to cause the microcomputer to selectively operate in accordance with either the stitch control operation program or the malfunction diagnosing control operation program;
    (c) indication means including a plurality of illumination lamps turned on and off selectively to indicate the designated one of the patterns of the stitch control operation program and the malfunction diagnosing control operation program in dependence upon the selective operation of said change-over switch, said lamps also indicating the checking items when the diagnosing control operation program is designated;

(d) a plurality of operation switches selectively operated to cause the microcomputer to select a pattern to be stitched and to set the sewing machine in relation to the selected pattern when the change-over switch is operated to designate the stitch control operation program, said operation switches being selectively operated to designate the checking items and the order thereof when the change-over switch is operated to designate the diagnosing control operation program.

* * * * *